(12) United States Patent
Segerljung et al.

(10) Patent No.: US 7,689,336 B2
(45) Date of Patent: Mar. 30, 2010

(54) VEHICLE AND A METHOD FOR CONTROLLING STEERING THEREOF

(75) Inventors: Max Segerljung, Vannas (SE); Kurt Dahlstrom, Bjurholm (SE); Johanna Dahlstrom, legal representative, Vallentuna (SE)

(73) Assignee: Stock of Sweden AB, Stromsund (SE)

( * ) Notice: Subject to any disclaimer, the term of this patent is extended or adjusted under 35 U.S.C. 154(b) by 930 days.

(21) Appl. No.: 10/521,281

(22) PCT Filed: Jun. 23, 2003
(Under 37 CFR 1.47)

(86) PCT No.: PCT/SE03/01073

§ 371 (c)(1),
(2), (4) Date: May 30, 2006

(87) PCT Pub. No.: WO2004/007262

PCT Pub. Date: Jan. 22, 2004

(65) Prior Publication Data

US 2006/0247837 A1    Nov. 2, 2006

(30) Foreign Application Priority Data

Jul. 15, 2002    (SE) .................................... 0202208

(51) Int. Cl.
*B62D 61/00* (2006.01)
(52) U.S. Cl. ......................................... 701/41; 180/252
(58) Field of Classification Search .................. 701/41; 180/252, 253, 263–265, 408, 411, 402, 22–24, 180/6.2, 6.24, 6.28, 6.48, 6.5, 6.6, 6.62
See application file for complete search history.

(56) References Cited

U.S. PATENT DOCUMENTS

| | | | | |
|---|---|---|---|---|
| 2,110,213 A | * | 3/1938 | Flowers | 180/23 |
| 4,372,407 A | * | 2/1983 | McColl | 180/6.2 |
| 5,924,512 A | * | 7/1999 | Wada | 180/253 |
| 6,721,629 B2 | * | 4/2004 | Wendling et al. | 700/279 |
| 2002/0069005 A1 | | 6/2002 | Kokura | |

FOREIGN PATENT DOCUMENTS

WO        99/54190        10/1999
WO        03/059720 A1    7/2003

* cited by examiner

*Primary Examiner*—Dalena Tran
(74) *Attorney, Agent, or Firm*—Dilworth & Barrese LLP.

(57) ABSTRACT

A vehicle comprises a regulation device for ordering of movements of the vehicle (1) in a horizontal plane and a control device with a calculation unit arranged to produce signals to control the control and drive means of the vehicle's wheels (3) by information from the regulation device to achieve movement as instructed by the regulation device. The regulation device is designated with the capability to, on request of a change of the vehicle's direction in the horizontal plane, order a location for a turning point (B) for the vehicle located anywhere in the horizontal plane. The control device's calculation unit is designed to calculate the instantaneous desired value of the respective wheel's angular alignment relative to a lengthwise axis of the vehicle corresponding to the location of said turning point as ordered by the regulation device and send signals to the control means so as to achieve that alignment.

30 Claims, 6 Drawing Sheets

VEHICLE AND A METHOD FOR CONTROLLING STEERING THEREOF

BACKGROUND OF THE INVENTION AND PRIOR ART

The present invention relates to a vehicle and a method for controlling thereof according to the description herein.

The vehicle can be of many different types, and the invention includes both driver controlled as well as driver-less, remote controlled vehicles. The invention is however in particular, but not exclusively, directed towards vehicles which will move in environments where space is relatively limited and where high demands are placed on the vehicles' manoeuvrability, as is the case for industrial trucks, which are driven in warehouses, industrial sites, loading yards and other such places to handle cargo. For this reason the invention will hereafter mainly be described in connection with vehicles of such so-called truck type without limiting the invention in any way thereto.

A vehicle of the type defined by way of introduction is known from the applicant's patent application PCT/SE99/00618. By arranging said two first wheels in the indicated way excellent properties to displace such a vehicle in a confined space according to advantageous movement patterns are achieved. The reason for this is that it can be said that such a wheel can be turned on the spot without any tendency to slip in that on turning the wheel one revolution around the first axis it will with said turning point describe a circle on the ground. At the same time it is made possible to take up new alignments of the wheel while the chassis is totally still, which means that the vehicle can be brought to a new position in the shortest possible or otherwise most desirable way.

It is stated here that the invention is fully realisable with only said first wheels of said first type and no other means resting on the ground to support the chassis, so that in this case the vehicle has to be balanced like a motorcycle, even if hereafter the diagrams and the accompanying text show and describe the case of a vehicle with four wheels, as this is the way the vehicle will usually be realised. The desire exists to improve the way in which the vehicle of the discussed type is controlled in order to make full use of the excellent possibilities of displacement patterns which such a vehicle offers.

SUMMARY OF THE INVENTION

The aim of the present invention is to provide a vehicle and a method for controlling thereof which make it possible to fulfill said desire.

This aim is achieved by providing a regulation device which is designed with the capability to, on request of the change of the vehicle's direction in horizontal plane, order a location for a turning point for the vehicle located anywhere in the horizontal plane, the control device's calculation unit is designed to calculate the instantaneous desired value of respective said first wheel's angular alignment relative to a longitudinal axis of the vehicle corresponding to the location of said turning point as ordered by the regulation device and send signals to the control means so as to achieve that alignment.

With such a design of the regulation device and the control device of the vehicle arbitrary movement patterns of the vehicle can be achieved by simple means. If the vehicle is displaced without any change in its direction in the horizontal plane, i.e. according to a translational movement, then it is driven in a conventional way with the wheels in parallel alignment with each other, but if a direction change of the vehicle is required, then an arbitrary location of the vehicle's swinging point or turning point can be ordered by the regulation device and the direction change can then be achieved by turning the vehicle around the ordered turning point by the control device. This can accordingly be located anywhere in relation to the vehicle, for example it can be ordered to lie at the front edge of a fork of a vehicle in form of a forklift truck, so that the vehicle turns about the front edge of the fork.

It is pointed out here that "calculate" as used in the patent claims is to be given a broad meaning, and that it is not necessary that the calculation unit carries out an actual calculation, but it is even possible that it just "registers" what the regulation device orders and forwards desired values depending upon this registration to the control means. It is even possible that value tables are stored in advance in the calculation unit to carry out the predetermined control of the wheels on receipt of a certain order from the regulation device, but in most cases an optional, step-free control with an infinite number of possible alignments and the possibility of absolute precision is preferred.

According to a preferred embodiment of the invention the calculation unit is designed to assume an alignment of said first wheels about the first axis parallel to each other on calculation of the desired value for each wheel alignment in the horizontal plane for a determined position of the said turning point to determine each wheel's turning about said first axis relative to said parallel alignment. By assuming a determined parallel alignment of the wheels relative to one another in said calculations (defined as above), the individual wheels' turning to turn the vehicle around an ordered turning point can be decided in an excellently simple way. This even makes it possible to simply return to the parallel alignment when so desired and it is especially advantageous to design the calculation unit to select the alignment that the vehicle's wheels had as the last parallel alignment before the regulation device's ordering of a said alignment change as the -assumed parallel alignment in its calculations, which is the object for a further preferred embodiment of the invention. This simplifies the calculations and, facilitates the return to the initial parallel alignment of the wheels.

According to another preferred embodiment of the invention the calculation unit is designed to establish a Cartesian co-ordinate system in the horizontal plane for its calculations with the chassis' centre of rotation as origin and to utilise the co-ordinate for said location of the vehicle's turning point in said co-ordinate system in the calculation of said alignment of each said first wheel, and it is then especially advantageous if the calculation unit is arranged to designate an axis in said Cartesian co-ordinate system to be directed parallel to said assumed parallel alignment. This then means that in the above-mentioned case of selecting the last parallel alignment as the assumed parallel alignment if this parallel alignment was not in the vehicle's longitudinal direction the co-ordinate system will be turned relative to the vehicle's longitudinal direction to facilitate the calculation.

According to another preferred embodiment of the invention the regulation device comprises a first means to order a parallel displacement of the vehicle's steering line, i.e. the intended line that intersects said turning point and extends perpendicularly to said assumed parallel alignment, and according to another embodiment the regulation device comprises a second means to displace the turning point ordered by the regulation device along with the instantaneously existing steering line of the vehicle, which in practice means that the vehicle's swinging radius is changed. It is thereby advantageous to have the first and second means controllable totally independently of one another, so that by manoeuvring these the ordered turning point can be decided at an arbitrary location in said co-ordinate system and thereby the horizontal plane.

The invention even relates to a method according to the description herein. The properties and advantages of this will be apparent from the above description of the corresponding vehicle.

The invention even relates to a computer program and a computer readable medium. It is easily understandable that the method according to the invention is well suited to be carried out by program instructions from a processor under the influence of a computer program provided with the program steps in question.

Other advantages as well as advantageous features of the invention are apparent from the following description.

BRIEF DESCRIPTION OF THE DRAWINGS

In the following, some preferred embodiments of the invention are described as examples with reference to the attached drawings, in which.

DETAILED DESCRIPTION OF PREFERRED EMBODIMENTS OF THE INVENTION

Figure 1:
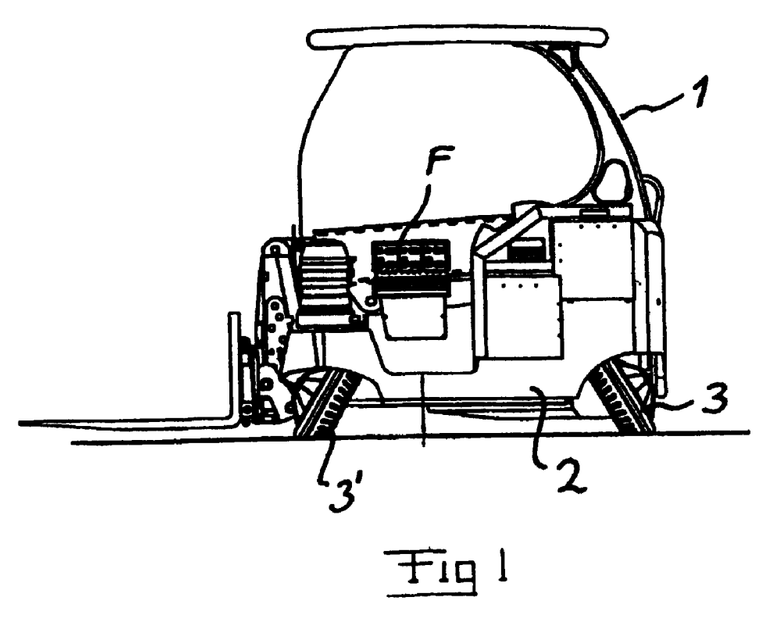
FIG. 1 is a view of a vehicle of the inventive type.
Figure 2:
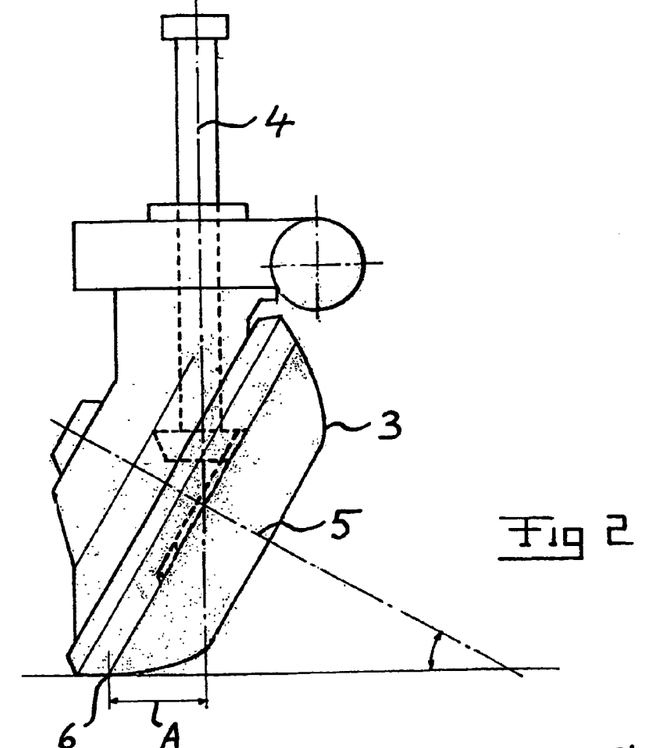
FIG. 2 is a schematic view illustrating the general construction and function a said first wheel of such a vehicle, FIG. 3 schematically illustrates a possible parallel alignment of the wheels of the vehicle according to the invention.

FIG. 1 schematically illustrates the design of an inventive vehicle 1 in the form of an industrial truck with a driver seat F, a chassis 2 and first wheels of a first type connected to the chassis in the vicinity of each corner of a rectangle in the horizontal plane. Such a first wheel is shown in FIG. 2 and is arranged to be rotatable relative to the chassis not only about a first, substantially vertical axis 4, but also about a second axis 5 which constitutes an angle greater than 0° but less than 90°, here about 60°, relative to the first axis. The wheel has a contact surface, which forms a so-called turning point 6 against this, which is laterally displaced in a horizontal plane relative to the first axis (region A). This displacement of the turning point 6 relative to the first axis 4 means that on one revolution of the wheel around the axis a circle will be traced on the ground by the wheel's rolling point 6.

All four wheels are individually controllable as regards the turning around the first axis 4, while two of them, in the present case both of the front wheels 3' are individually drivable (arbitrarily two, three or four of the wheels could be individually drivable). This design of the wheels means that they can occupy an arbitrary position while the chassis is totally still.

Figure 3:
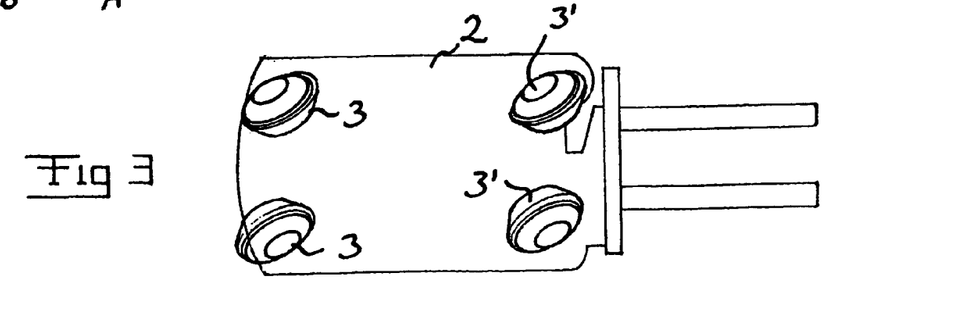
Figure 4:
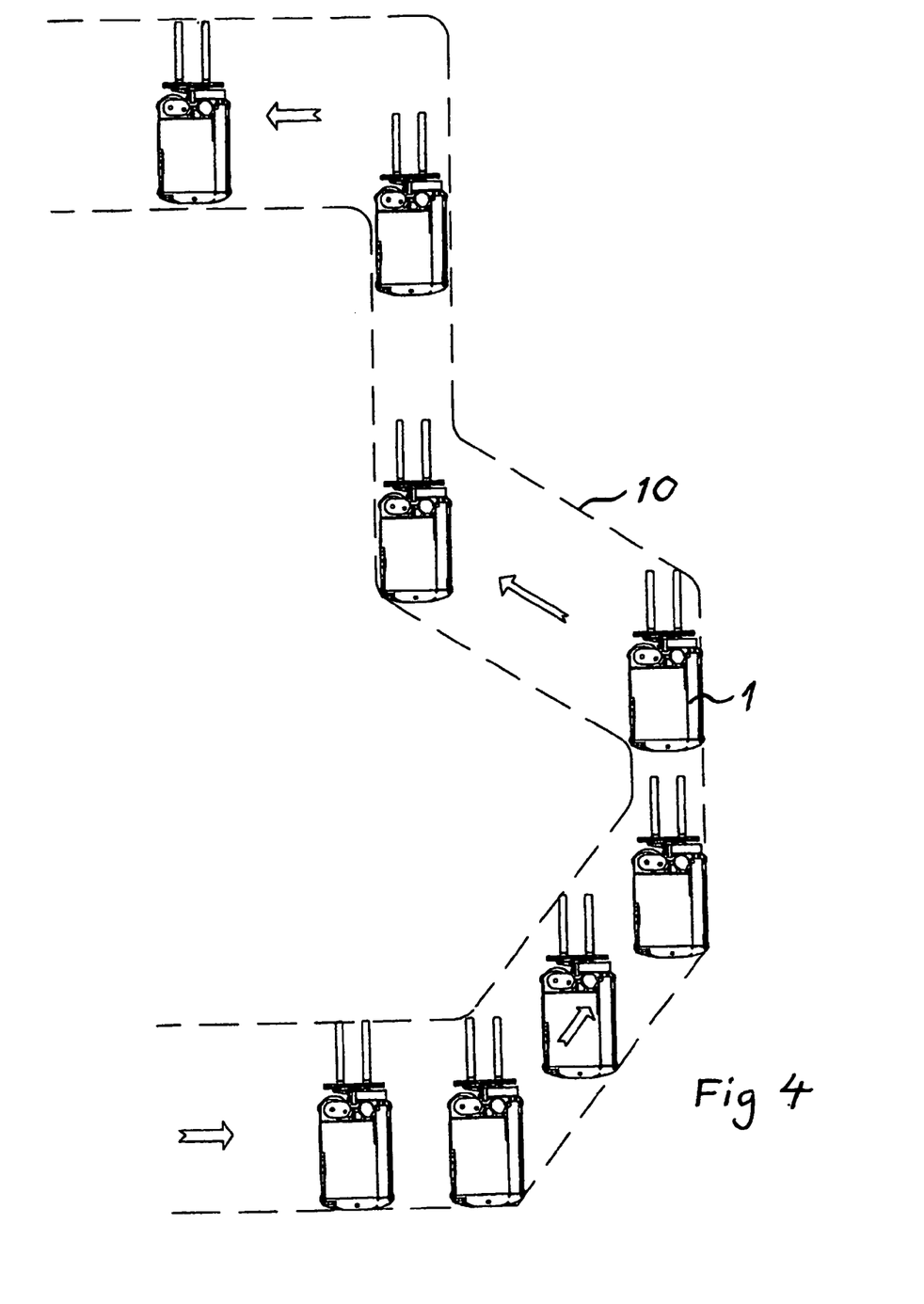
FIG. 4 illustrates a movement pattern achievable by a vehicle of the inventive type by parallel alignment of the wheels.
Figure 12:
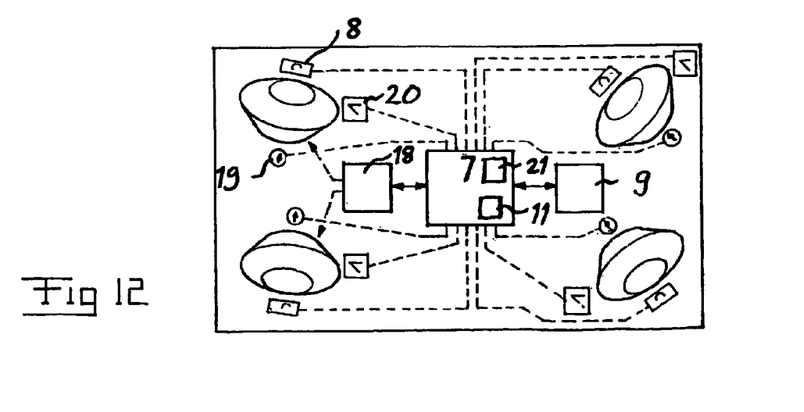
FIG. 12 illustrates very schematically the components, which are used in the control of a vehicle according to a preferred embodiment of the invention.

FIG. 3 schematically illustrates how the wheels can for example be aligned parallel with each other even if they are turned relative to the vehicle's lengthwise direction. The control device 7 incorporated in the vehicle (see FIG. 12) is arranged to control said wheels via the control means 8 according to the basic principle that they should be mutually parallel-aligned on movement of the vehicle in the horizontal plane with the exception of when a change in the vehicle's direction in the horizontal plane is ordered by the regulation device 9. This means that in order to get to a position which does not lie along the vehicle's lengthwise axis and in which the vehicle will have the same alignment as that concerned the vehicle's alignment is not changed to drive towards the position and then changed back, as is necessary with conventional vehicles, but translational displacements of the vehicle between different points takes place in such cases without the demands of temporary alignment changes of the vehicle, and an example of such displacements is shown in FIG. 4, where the vehicle's movement direction is changed by changing the alignment of the mutually parallel aligned wheels relative to the vehicle's lengthwise direction. The sweep area 10 which the vehicle "shadows" as it drives forward over the indicated area is marked with a dashed line. This sweep area defines a space which has to be free in order for the vehicle to move itself over the ground, and due to the inventive vehicle's design and control method a greater flexibility as regards the variation of this sweep area and possibilities to reduce it where the available space is limited are achieved. This is especially important in the case of industrial trucks, which move over an industrial floor, where great cost can be saved by better utilization of the surfaces.

The crux of the present invention will now be described with simultaneous reference to FIGS. 5 and 6 and even FIGS. 9 to 12 to a certain degree.

Figures 5, 6:
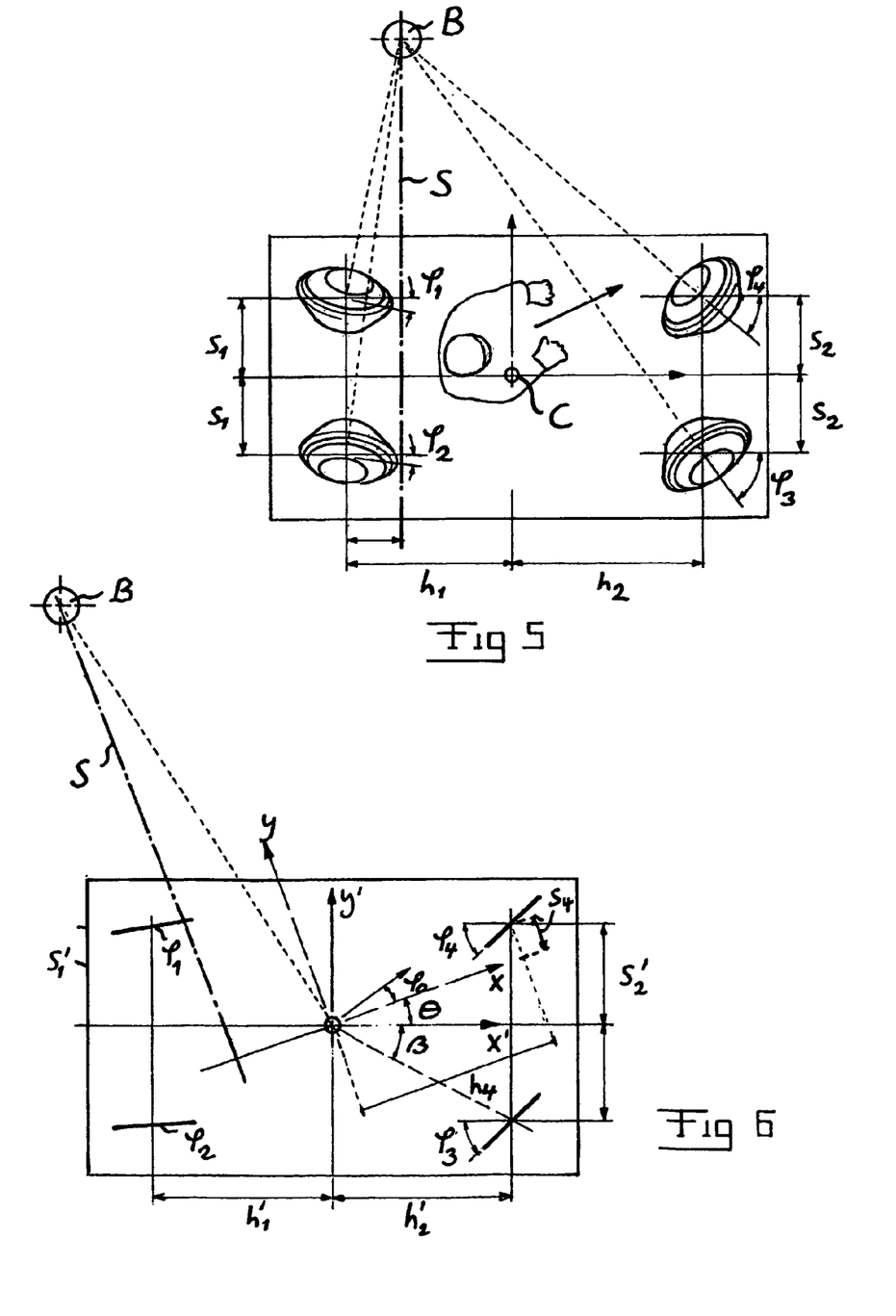
FIGS. 5 and 6 are schematic views of an inventive vehicle viewed from above illustrating how the control device calculates the wheel alignment for an ordered turning point location.

FIG. 5 schematically illustrates an inventive vehicle with the chassis' centre of rotation C as the origin in a Cartesian co-ordinate system of a calculation unit 11 of the control device for alignment of the wheels on the basis of orders from the regulation device 9. The calculation unit is arranged to assume an alignment of the wheels about their fist axes parallel with one another on calculation of desired values for each wheel's alignment in the horizontal plane for a determined location of a chosen turning point to determine each wheel's turning about the first axis relative to the parallel alignment. The co-ordinate system is thereby applied so that an axis (here the X-axis) is directed parallel to said assumed parallel alignment. This assumed parallel alignment can be arbitrarily chosen by the control device, but the parallel alignment which the vehicle's wheels just have is preferably chosen for this, when an alignment change, i.e. swinging, of the vehicle will be initiated. In FIG. 5 the assumed parallel alignment is in agreement with the vehicle's lengthwise axis, while FIG. 6 illustrates how the assumed parallel alignment constitutes an angle θ, so in FIG. 5 θ is therefore equal to zero.

The vehicle's steering line S is defined as the intended line which intersects the ordered turning point B and extends perpendicularly towards the assumed parallel alignment that the calculations are based upon, i.e. the X-axis. The wheels are aligned so that the horizontal projection of their second axes intersect each other at turning point B, and in a conventional vehicle with only two controllable wheels said steering line therefore always coincides with the axis of both of the uncontrolled wheels. In the inventive vehicle the turning point B and the steering line S can however be positioned arbitrarily.

Figure 9:
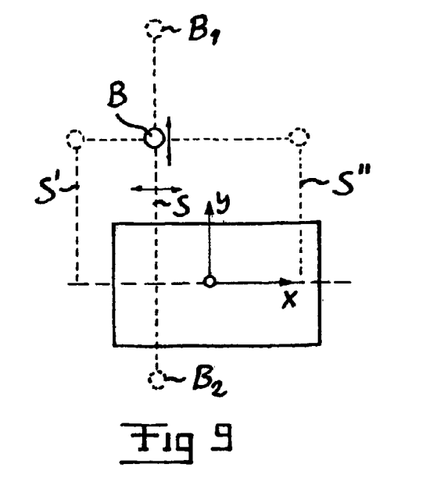
FIG. 9 illustrates very schematically how the steering line can be displaced relative to the vehicle and how the turning point can be displaced along a given steering line relative to the vehicle of a vehicle according to the invention, FIG. 10 schematically illustrates a possible embodiment of the means incorporated in the regulation device, FIG. 11 schematically illustrates another possible embodiment of means incorporated within the regulation device.

It will now be explained with reference to mainly FIGS. 9 to 11 how the order concerning the location of the turning point B relative to the vehicle can be given via a regulation device of the vehicle. The regulation device comprises first means to order a parallel displacement of the vehicle's steering line S, i.e. along the X-axis in the way that is indicated in FIG. 9 by arrows and two possible positions S' and S". At the same time there are other means to order the displacement of the turning point along the instantaneously existing steering line of the vehicle, which are indicated with the line L and two possible alternative positions $B_1$ and $B_2$. If the turning point is displaced to infinity along the Y-axis, this means driving straight ahead, while the vehicle's swing radius becomes smaller the nearer it gets to the vehicle's centre of rotation.

Figure 10:
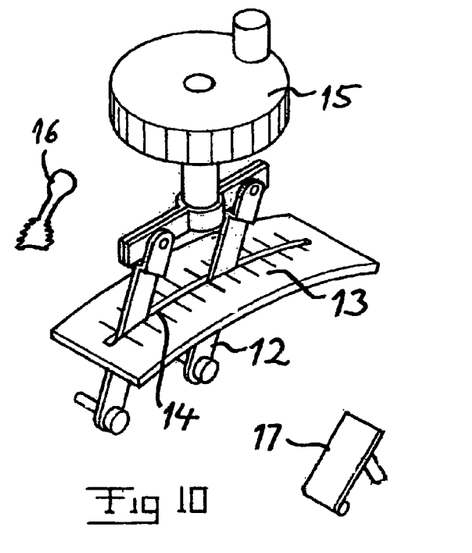
Figure 11:
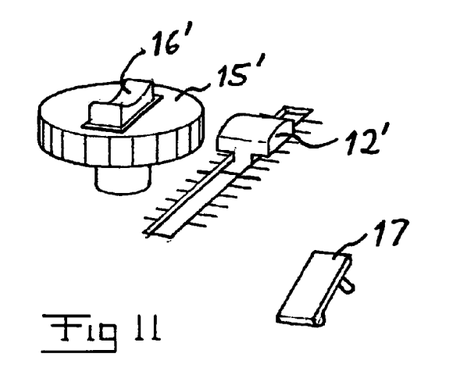

Arbitrary locations for the vehicle's turning point B in the horizontal plane are ordered by said first and second means, of which some of the multitude of different possible variations are shown in FIGS. 10 and 11. FIG. 10 illustrates how said first means 12 is constituted of a lever, in this case a parallel link system, which is movable along a scale 13, on which different locations of steering lines relative to the vehicle are indicated with lines 14. Another means in the form of a turnable steering wheel 15 for ordering of displacement of the turning point along a given steering line is rotatably mounted on the lever aggregate 12. It feels natural for a driver to have a turnable element for this function, because it influences the vehicle's swing radius. The regulation device comprises a further third means in the form of a lever 16 for alignment of the direction of rotation, forwards or backwards, of both of the controllable wheels. The regulation device also has a fourth means in the form of an accelerator 17 to order the speed to the drive means 18 (see FIG. 12) to drive both of the controllable wheels.

FIG. 11 illustrates alternative embodiments of the means of the regulation device, and here the means for displacement of the vehicles steering lines, here in the form of a sliding bolt 12', physically separated (in FIG. 10 it is only functionally separated) relative to the means for displacement of the turning point along a steering line, which even has a steering wheel 15', on which a tilting lever 16' is arranged to set the driving forwards or backwards.

When a location is ordered via the regulation device signals are sent to the control device 7 which assuming said assumed parallel alignment of the wheels calculates a desired value of the alignment of each individual wheel relative to the vehicle's lengthwise axis, see the angles $\phi_1$-$\phi_4$, to control the wheels at these angles via the control means 8. These calculations take place according to the equations given below for the respective angle, where the different parameters are shown in FIG. 6:

$$\varphi_1 = \Theta + atan\left(\frac{h_1+x}{y-s_1}\right), \text{ with } \begin{array}{l} s_1 = \sqrt{s_1'^2 + h_1'^2} \cdot \sin(\beta+\Theta) \\ h_1 = \sqrt{s_1'^2 + h_1'^2} \cdot \cos(\beta+\Theta) \end{array}$$

-continued $$\varphi_2 = \Theta + atan\left(\frac{h_2+x}{y+s_2}\right), \text{ with } \begin{array}{l} s_2 = \sqrt{s_1'^2 + h_1'^2} \cdot \sin(\beta-\Theta) \\ h_2 = \sqrt{s_1'^2 + h_1'^2} \cdot \cos(\beta-\Theta) \end{array}$$

$$\varphi_3 = \Theta + atan\left(\frac{h_3-x}{y+s_3}\right), \text{ with } \begin{array}{l} s_3 = \sqrt{s_2'^2 + h_2'^2} \cdot \sin(\beta+\Theta) \\ h_3 = \sqrt{s_2'^2 + h_2'^2} \cdot \cos(\beta+\Theta) \end{array}$$

$$\varphi_4 = \Theta + atan\left(\frac{h_4-x}{y-s_4}\right), \text{ with } \begin{array}{l} s_1 = \sqrt{s_1'^2 + h_1'^2} \cdot \sin(\beta-\Theta) \\ h_1 = \sqrt{s_1'^2 + h_1'^2} \cdot \cos(\beta-\Theta) \end{array}$$

where $h_1'$ and $h_4'$ are the wheel base and $s_1'$ and $S_2'$ are the track gauge, while the corresponding $h_1$ and $h_4$ and $s_1$ and $s_2$ respectively are the values which are used for these for the calculations when the co-ordinate system is turned through angle θ relative to the vehicles lengthwise axis. θ is therefore positive on clockwise turning and negative on anti-clockwise turning of the co-ordinate system. θ is therefore negative in FIG. 6. x and y are the co-ordinates for the turning point B in the co-ordinate system.

The control device is preferably even arranged to calculate a suitable velocity of rotation of the wheel about its second axis via its calculation unit for each said first turnable wheel from the wheels distance from said turning point B in co-operation with the fourth means 17. A clean and economical course for each drive wheel can thereby be achieved. The undriven wheels automatically get the correct speed. The speed of the driven wheels is calculated thereby according to the following:

$$v_1 = \dot\phi \frac{h_1+x}{\sin\varphi_1}$$

$$v_2 = \dot\phi \frac{h_2+x}{\sin\varphi_2}$$

$$v_3 = \dot\phi \frac{h_3-x}{\sin\varphi_3}$$

$$v_4 = \dot\phi \frac{h_4-x}{\sin\varphi_4}$$

where $\dot\phi$ is the angular velocity of the vehicles swinging about the turning point, and this is therefore the same for all parts of the vehicle. In embodiment shown the wheels with $\phi_3$ and $\phi_4$, and therefore with the speeds $v_3$ and $v_4$, are used as the driving wheels.

The vehicle even exhibits means 19 (see FIG. 12) to sense the rotational velocity and direction of rotation of the drive wheels and means 20 to sense the respective wheels actual angle relative to the vehicles lengthwise axis to send the values of the sensed parameters to the control device 7 in order for the means 21 incorporated therein to compare the results of said sensing with the corresponding desired values ordered by the calculation units calculations, and the control device is arranged to correct the control signals to the control means 8 and drive means 18 to achieve agreement between the results and the desired values in the event of deviation between said results and desired values.

It is clear from the above that it is advantageous that the control device is constituted of a programmable computer, that can therefore be reprogrammed if necessary.

Figures 7, 8:
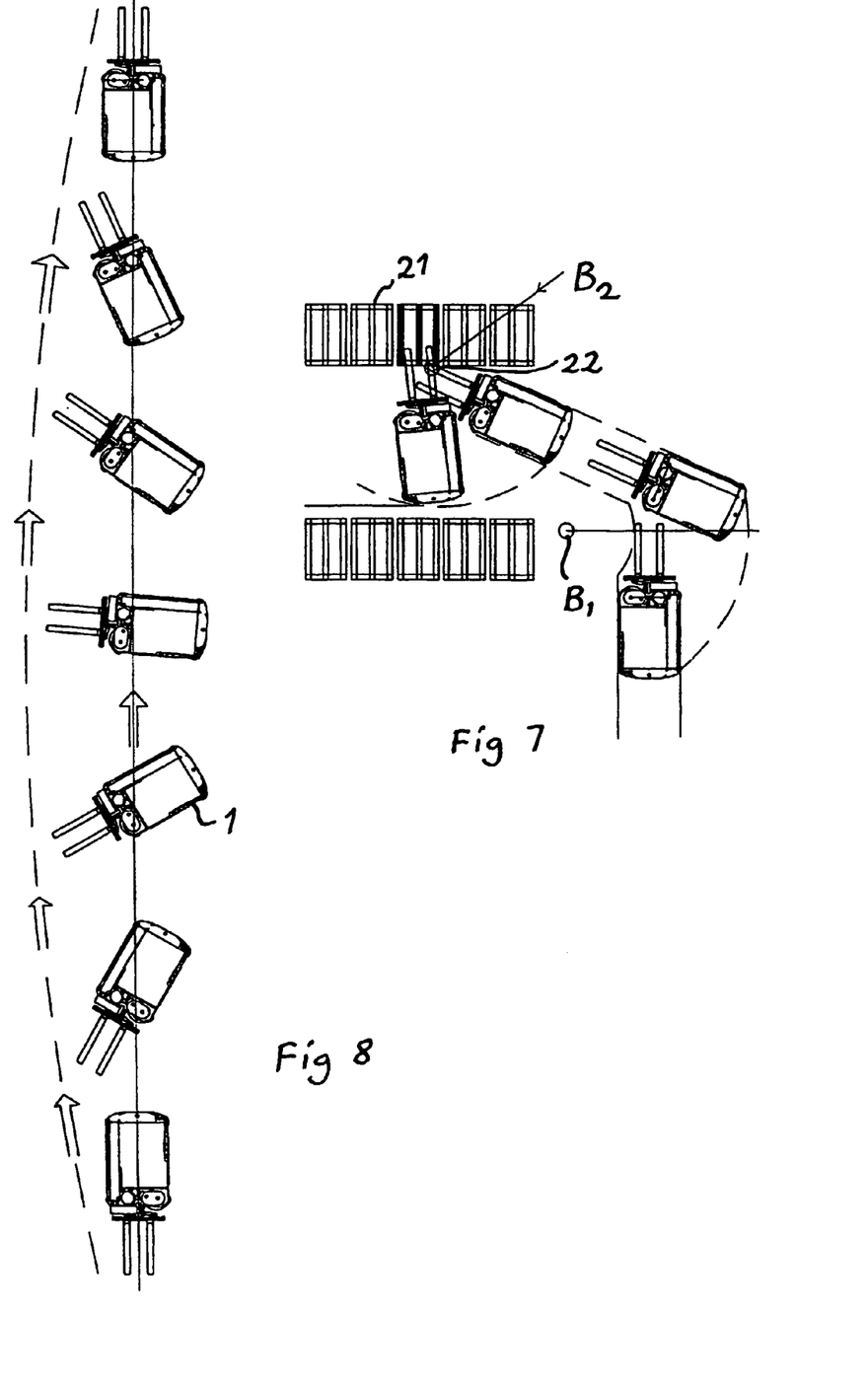
FIG. 7 is a view illustrating an achievable movement pattern of the vehicle according to the invention using the control modes described with help of FIGS. 5 and 6.
FIG. 8 illustrates a different movement pattern possible with the inventive vehicle.

FIGS. 7 and 8 show two of the infinitely many movement patterns that are achievable with a vehicle according to the present invention, which cannot be achieved with a conventional vehicle.

In FIG. 7 the truck's driver firstly orders a swinging of the truck around a turning point $B_1$ which lies in front of and at the side of the truck via the regulation device. After driving straight forwards towards a row 21 of loading pallets or such, the driver decides that it is suitable to swing the truck around a turning point $B_2$ located at the front edge of one of the forks 22 of the truck's lifting aggregate. The driver does not have to reverse and drive forward the truck a number of times in order to get into the right position to lift the pallet in question, but can achieve this directly.

FIG. 8 illustrates how it is possible with the inventive truck to drive along a straight line and at the same time rotate the truck, through 180° for example.

The invention is of course not in any way limited to the preferred embodiments described above, but a multitude of modification possibilities thereof should be apparent for a person skilled in the art, without him having to deviate from the basic idea of the invention for that reason.

For example in straightforward parallel driving the control at the wheels could be coupled together to take place via a single control means or in pairs via two.

As has already been mentioned the vehicle could exhibit a different number of wheels rather than four, for example such as two or three, and in a case with more than two wheels it is not necessary that the further wheels are of said first type. Instead they could be of the link wheel type or be constituted of some other part with at least corresponding movability, which theoretically could be a part with a slideable support point that is substantially free relative to the ground in the horizontal plane, such as a part that utilizes an air cushion or such.

As regards the use of the word "horizontal" and "vertical" in this document in relation to the vehicle and its construction and control they refer to locations when the vehicle is resting on the horizontal surface, and axes and such are of course differently directed on driving on a sloping surface or over obstructions.

The invention claimed is:

1. Vehicle comprising
   a chassis (2),
   at least two first wheels (3) of a first type, which are arranged to support the chassis when resting on the ground and which are each arranged to be rotatable relative to the chassis not only about a first substantially vertical axis (4) extending through said respective wheels (3), but also about a second axis (5) that constitutes an angle greater than 0° but less than 90° relative to both the first substantially vertical axis (4) and a horizontal axis, such that each said wheel has a contact surface against the ground that defines a rolling point (6) which is horizontally displaced from the first substantially vertical axis (4) and upon one revolution of each said wheel, a circle is traced on the ground by said rolling point (6),
   means (8) for individually controlling the alignment of said wheels relative to the chassis by turning about the first axis (4),
   means (18) for individually driving said wheels,
   a regulation device (9) to regulate the movements of the vehicle in a horizontal plane,
   a control device (7) with a calculation unit (11) arranged to produce signals to control said control and drive means via information from the regulation device to achieve the movement as instructed by the regulation device,
   wherein the regulation device is designed with the capability to, on request of a change of the vehicle's direction in a horizontal plane, order a position for a turning point (B) for the vehicle anywhere in the horizontal plane, the control device's calculation unit is designed to calculate instantaneous desired value of respective said first wheel's angular alignment relative to a lengthwise axis of the vehicle corresponding to the location of said turning point as ordered by the regulation device and send signals to the control means to achieve that alignment, and
   said regulation device comprises
   first means (12, 12') for displacing a steering line (S) gassing through the turning point (B) of the vehicle from one location (S') to another (S'') in parallel, and
   second means (15, 15') for simultaneously displacing said turning point (B) along said steering line (S) from one location ($B_1$) to another ($B_2$).

2. Vehicle according to claim 1, wherein the calculation unit (11) is designed to assume an alignment of said first wheels (3) about the first axis parallel to each other on calculation of the desired value for each wheel's alignment in the horizontal plane for a determined position of said turning point (B) to determine each wheel's turning about said first axis relative to said parallel alignment.

3. Vehicle according to claim 2, wherein the calculation unit (11) is arranged to select the alignment that the vehicle's wheels (3) had as the last parallel alignment before the regulation device's ordering of alignment change as the assumed parallel alignment in its calculations.

4. Vehicle according to claim 2, wherein the regulation device comprises a first means (12, 12') to order a parallel displacement of a steering line (S) of the vehicle meaning an intended line that intersects said turning point (B) and extends perpendicularly to said assumed parallel alignment.

5. Vehicle according to claim 2, wherein the regulation device comprises a second means (15, 15') to displace the turning point (B) ordered by the regulation device along with an instantaneously existing steering line (S) of the vehicle being an intended line that extends through said turning point and perpendicularly to said assumed parallel alignment.

6. Vehicle according to claim 5, wherein said first and second means are controllable totally independently of one another.

7. Vehicle according to claim 1 wherein said calculation unit (11) is designed to establish a Cartesian co-ordinate system in the horizontal plane for its calculations with the chassis' centre of rotation (C) as origin and to utilize co-ordinates for said location of the vehicle's turning point (B) in said co-ordinate system in the calculation of said alignment of each said first wheel (3).

8. Vehicle according to claim 7, wherein the calculation unit (21) is arranged to designate an axis (x) in said Cartesian co-ordinate system to be directed parallel to said assumed parallel alignment.

9. Vehicle according to claim 1 wherein the control device (7) is arranged to control said wheels via the control means (8) according to a basic principle that they should be mutually parallel-aligned on movement of the vehicle in the horizontal plane with exception of when a change in the vehicle's direction in the horizontal plane is ordered by the regulation device.

10. Vehicle according to claim 1, wherein the regulation device comprises a third means (16, 16') to set said drive means' (18) direction of the respective first wheels' driving about said second axis.

11. Vehicle according to claim 1, wherein the regulation device comprises a fourth means (17) to set velocity of the respective first wheels' (3) rotation about the second axis brought about by the drive means (18).

12. Vehicle according to claim 11, wherein the calculation unit (11) is arranged to calculate a suitable rotational velocity of the wheel about its second axis in co-operation with said fourth means (17) for each said first drivable wheel (3) from distance of the wheel from said turning point (B).

13. Vehicle according to claim 1, wherein it comprises means (20) arranged at each of the vehicle's wheels to sense the wheels' alignment about the first axis relative to the chassis.

14. Vehicle according to claim 13, wherein the control device comprises means (21) arranged to compare the result of said sensing with corresponding desired values ordered via the calculation units calculations, and to correct the control signals to control means/drive means (8/18) on deviation between said result and desired value.

15. Vehicle according to claim 1, wherein it comprises means (19) arranged at each of the vehicle's drivable wheels (3) to sense rotational velocity and direction of rotation about said second axis of the wheel.

16. Vehicle according to claim 1, wherein the control device (7) comprises a programmable computer.

17. Vehicle according to claim 1, wherein apart from the two said first wheels (3) said vehicle comprises at least one further part (3) arranged to support the chassis and form a third support point for the chassis on the ground, and said part is formed from a link-wheel or another part with at least the corresponding mobility as said wheels (3).

18. Vehicle according to claim 17, wherein said further part is said first wheel (3).

19. Vehicle according to claim 17, wherein it comprises two said further parts which are wheels.

20. Vehicle according to claim 19, wherein four first wheels (3) are attached to the chassis (2) substantially in each corner of a rectangle in the horizontal plane.

21. Vehicle according to claim 19, wherein the two said first wheels (3) are individually drivable and controllable, and the other two first wheels are individually controllable.

22. Method for controlling the movements of a vehicle (1) over the ground on which the vehicles resides, whereby the vehicle comprises a chassis (2), at least two first wheels (3) of a first type, which are arranged to support the chassis when resting on the ground and comprising the steps of arranging each said first wheels to be rotatable relative to the chassis not only about a first, substantially vertical axis (4) extending through said respective wheels (3), but also about a second axis (5) that constitutes an angle greater than 0° but less than 90° relative to both the first substantially vertical axis (4) and a horizontal axis, whereby each said wheel has a contact surface against the ground that defines a rolling point (6) which is horizontally displaced from the first substantially vertical axis (4) and upon one revolution of each said wheel, traces a circle on the ground, controlling, with a regulation device (9), the movements of the vehicle in a horizontal plane, where the alignment of said wheels relative to the chassis is controlled individually by turning the wheel about the first substantially vertical axis (4), each said wheel is driven individually and, via information from the regulation device, signals are produced by calculation to achieve the movement as instructed by the regulation device, on request of a change of vehicle's direction in a horizontal plane, ordering a position for a turning point (B) via the regulation device for the vehicle anywhere in the horizontal plane, calculating for such an ordered location of said turning point (B) for the vehicle, the instantaneous desired value corresponding to the location of said turning point for the respective first wheel's angular alignment relative to a lengthwise axis of the vehicle, displacing, with said regulation device, a steering line (S) passing through the turning point (B) of the vehicle from one location (S') to another (S") in parallel, simultaneously displacing said turning point (B) along said steering line (S) from one location ($B_1$) to another ($B_2$), and controlling the wheels on the basis thereof.

23. Method according to claim 22, wherein the calculation of said desired value for each wheel's (3) alignment in the horizontal axis for a determined location of said turning point (B) assumes an alignment of each said first wheel about the first axis parallel to each other to determine a desired value for each wheel's turning about said first axis relative to said parallel alignment.

24. Method according to claim 23, wherein on said calculation the alignment that the vehicle's wheels (3) had as the last parallel alignment before the ordering of an alignment change of the vehicle is chosen as said assumed parallel alignment.

25. Method according to claim 23, wherein the vehicle is controlled by carrying out a parallel displacement of a steering line (S) of the vehicle, meaning an intended line that intersects said turning point (B) and extends perpendicularly to said assumed parallel alignment.

26. Method according to claim 23, wherein the vehicle is controlled by displacement of the vehicle's turning point along with an instantaneous existing steering line (S) of the vehicle being an intended line that intersects said turning point (B) and extends perpendicularly to said assumed parallel alignment.

27. Method according to claim 22, wherein on calculation a Cartesian co-ordinate system is established in the horizontal plane with the chassis' centre of rotation (C) as origin and co-ordinates for said location of the vehicle's turning point (B) in said co-ordinate system is used on calculation of said alignment of each said first wheel.

28. Method according to claim 27, wherein on calculation an axis (x) is designated to be directed parallel to said assumed parallel alignment in said Cartesian co-ordinate system.

29. Method according to claim 22, wherein said wheels (3) are controlled according to a basic principal that they should be mutually parallel-aligned on movement of the vehicle in the horizontal plane with an exception of when a change in the vehicles direction in the horizontal plane is ordered by the regulation device.

30. Method according to claim 22, wherein the alignment relative to the chassis (2) of each said wheel (3) is sensed and/or rotational velocity and direction of rotation about said second axis of each drivable wheel of the vehicle is sensed, and the results of said sensing is compared with corresponding desired values produced via said calculation, and on deviation between said results and desired values a control is carried out achieve agreement between the results and the desired values, to correct the control signals to the control means/drive means (8/18).

* * * * *